E. WORCH.

Assignor to H. L. WATTENBERG, said WATTENBERG assignor to L. A. CHICHESTER.

COMBINED STOOL AND CHAIR.

No. 10,005. Reissued Jan. 3, 1882.

WITNESSES:

Chas. Nida

Charles E. Simms Jr

INVENTOR

Emil Worch

By G. M. Plympton

ATTORNEY

N. PETERS, Photo-Lithographer, Washington, D. C.

UNITED STATES PATENT OFFICE.

EMIL WORCH, OF WASHINGTON, DISTRICT OF COLUMBIA, ASSIGNOR TO HERMAN L. WATTENBERG, OF NEW YORK CITY; SAID WATTENBERG ASSIGNOR TO LEMUEL A. CHICHESTER, OF PHOENICIA, NEW YORK.

COMBINED STOOL AND CHAIR.

SPECIFICATION forming part of Reissued Letters Patent No. 10,005, dated January 3, 1882.

Original No. 125,110, dated March 26, 1872. Application for reissue filed November 16, 1881.

*To all whom it may concern:*

Be it known that I, EMIL WORCH, of the city, county, and State of New York, but now residing in the city of Washington, District of Columbia, have invented a new and Improved Convertible High and Low Chair; and I do hereby declare that the following is a full, clear, and exact description of the same, reference being had to the accompanying drawings, and to the letters of reference marked thereon, making part of this specification, in which drawings—

Figure 1:
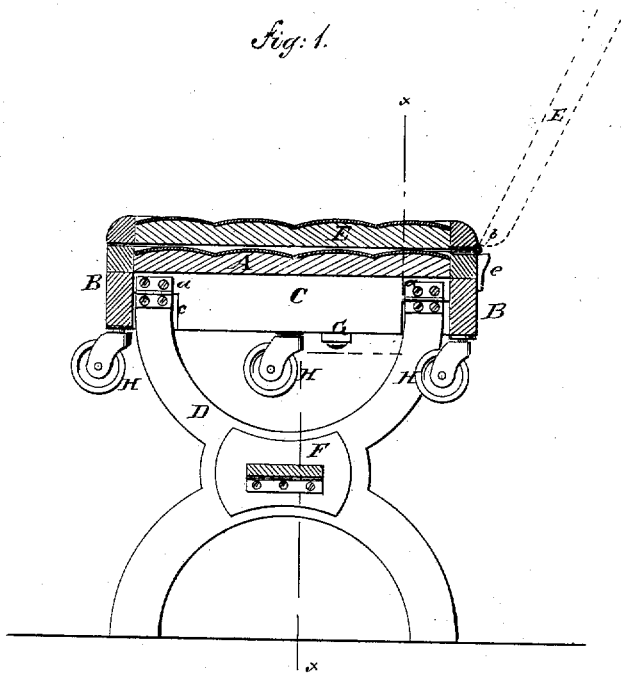
Figure 2:
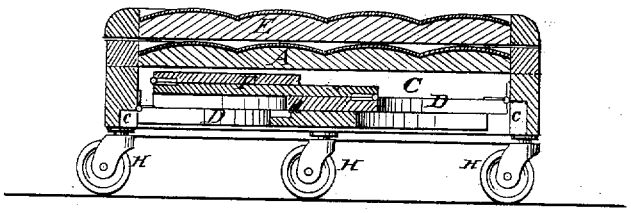

Figure 1 represents a vertical central section of this invention when used in its elevated position. Fig. 2 is a similar section of the same, taken in the line *x x*, Fig. 1, when folded and used in its lower position.

Similar letters of reference indicate like parts in both figures.

This invention relates to a combined stool, footstool, and chair; and it consists in a chair-seat of the usual construction, to which are secured by means of hinge-joints on opposite sides thereof two legs which are capable of being folded up beneath the same, being connected and retained in position when unfolded by a brace which is hinged to one of the legs. Above the seat is placed a back-rest, and connected to the same by hinge-joints, so that it can be raised or lowered on the seat, as desired. When said back-rest is raised it rests on a bracket secured to the side of the seat. The said seat is also provided with rollers, which support the same when it is used as a footstool.

In the drawings, the letter A designates a chair-seat, whose frame B is made to project downward beyond the upholstered part of the same, thus forming a chamber, C, beneath the seat, to the inner side of which, and on opposite sides thereof, are secured the legs D by means of hinge-joints *a*, so that said legs can be raised or lowered as desired. As these legs are folded on their hinges, they approach and diverge from each other.

E is a back-rest, which is secured to the seat by means of hinges *b*, so that it can be raised or lowered on the same. When said rest is raised my device may be used as a chair, the rest E being supported on brackets *e*, as seen in dotted outline in Fig. 1, secured to the side of the seat in any desirable manner. When the back-rest is lowered my device may be used as a stool.

When my device is to be used either as a stool or chair the legs D are let down from beneath the seat A, and their upper ends fit into recesses *c* on the inner side of the frame B, so that they will be flush with the side of the chamber C. The said legs are retained in position when unfolded by a brace, F, which is secured at right angles thereto, being hinged to one of the legs D, and entering a recess, *d*, formed in the opposite leg, so that it is capable of being folded up with the legs beneath the seat A. When the legs D and brace F are folded up within the chamber C they are prevented from dropping out by a button, G, which is secured to the frame B, extending across the bottom of the same, and secured to the opposite side in any desirable manner, thus supporting the legs within the chamber.

When my device is used as a footstool or a chair in its lowest position it rests on casters H, (see Fig. 2,) which are secured to the bottom edges of the frame B, and which may be removed, if desired, when my device is to be used as a stool or chair in its highest position.

If desired, the brackets *e* may be dispensed with and stop-hinges be used in their stead.

Having now described my invention, what I claim as new, and desire to secure by Letters Patent, is—

1. A convertible high and low chair provided with legs hinged to the seat-frame, upon which legs the chair is immediately supported in its highest position, and with permanently-secured rollers which support the chair in its lowest position as a trundle.

2. In a convertible high and low chair, the combination of rollers permanently fixed thereto and legs hinged to the seat-frame and adapted to move toward and from each other, whereby the chair may be raised to rest upon said legs and lowered to trundle upon said rollers.

3. In a convertible high and low chair, the combination of permanently-attached rollers, legs hinged to the seat-frame to approach and diverge from each other as the seat is raised and lowered, and a device to retain the legs rigidly in their upright position when the chair is elevated.

4. In a convertible high and low chair, the combination of permanently-attached rollers, legs hinged to the seat-frame and adapted to move toward and from each other as the seat is raised and lowered, and a device to firmly secure the legs in their folded position when the chair is in its lowest position and resting on the rollers.

EMIL WORCH.

Witnesses:
WM. H. FREUDENTHAL,
HOLMES E. OFFLEY.